Dec. 22, 1953   R. C. LARAMY   2,663,157
PORTABLE ICE CHEST FOR STORING FOODS AND THE LIKE
Filed Feb. 24, 1951
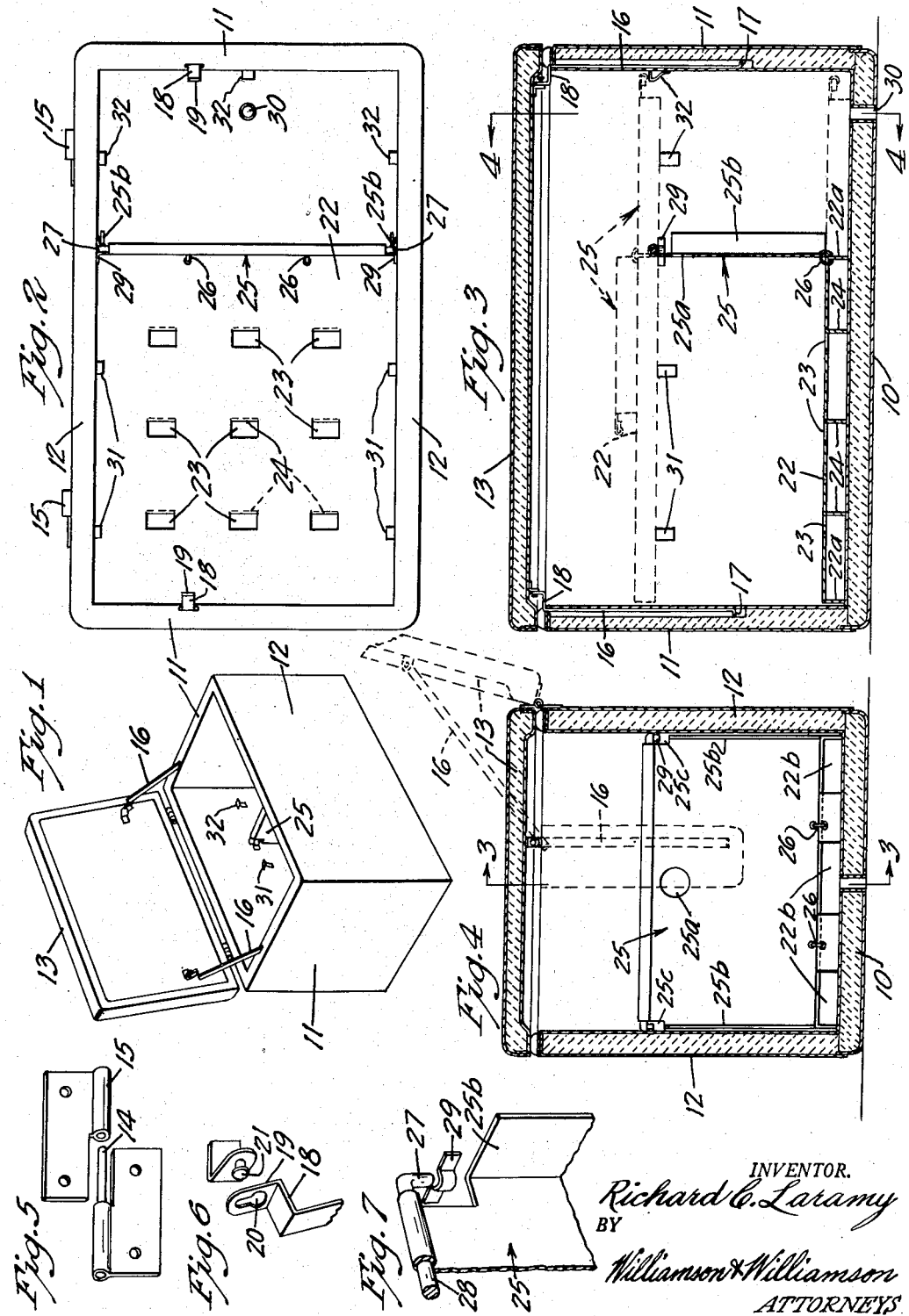
INVENTOR.
Richard C. Laramy
BY
Williamson & Williamson
ATTORNEYS Patented Dec. 22, 1953

2,663,157

UNITED STATES PATENT OFFICE 2,663,157

PORTABLE ICE CHEST FOR STORING FOODS AND THE LIKE

Richard C. Laramy, Joliet, Ill., assignor, by mesne assignments, to Queen Stove Works, Inc., Albert Lea, Minn., a corporation of Delaware Application February 24, 1951, Serial No. 212,573

6 Claims. (Cl. 62—85)

This invention relates to portable ice chests for storing foods and the like.

It is an object of my invention to provide a portable ice chest for storing and refrigerating foods and the like, in which a food supporting platform may be shifted into a number of selectable positions and which is provided with a hinged partition member connected at one end thereof which is adapted to be swung into various positions and provide a multi-function food storage compartment which is adapted to simultaneously provide not only a wet storage chamber but also a dry storage chamber, and which may be converted to provide a deep, dry storage chamber with a divided ice compartment.

It is another object to provide a portable ice chest having a hinged top cover with extremely simple yet highly efficient means for holding the cover in open position, the hinge and the holding means being constructed to permit extremely easy removal of the entire top cover from the body of the chest.

It is another object to provide a multi-function food storage platform having a number of fenestrations formed therein to permit free circulation of the air upwardly therethrough and constructed to provide intermediate support for the platform in slightly raised position above the bottom of the chest when said platform is in lowered position.

These and other objects and advantages will more fully appear from the following description made in connection with the accompanying drawings wherein like reference characters refer to the same or similar parts throughout the several views and in which:

Fig. 1 is a perspective view of the ice chest disclosed herein showing the hinged top cover in open position and the partition in upstanding position with the platform in lowered position;

Fig. 2 is a top plan view of the chest shown in Fig. 1 with the cover removed and the platform in lowered position;

Fig. 3 is a longitudinal vertical sectional view taken substantially along the line 3—3 of Fig. 4;

Fig. 4 is a transverse vertical sectional view taken substantially along the line 4—4 of Fig. 3;

Fig. 5 is a perspective view of the hinge construction for the top cover;

Fig. 6 is a detail perspective view of the cover holding braces; and

Fig. 7 is a detail perspective view of the locking means for holding the partition in upstanding relation.

As illustrated in the accompanying drawings, there is shown a portable ice chest for storing foods and the like having an insulated bottom 10, insulated ends 11 and insulated sides 12. An insulated cover 13 is hingedly connected in the form shown along one longitudinal edge of the rear side 12, as best shown in Figs. 1 and 2. A pair of elongated hinge pintles 14 are fixed to the rear side 12 adjacent the top thereof, and are adapted to receive the sleeve members 15 which are fixed to the top cover 13 at the rear longitudinal edge thereof. The sleeves 15 are slidably received on the pintles 14, as best shown in Fig. 2, both pintles 14 extend in the same direction to permit longitudinal shifting of the sleeves 15 thereon and facilitate removal of the top cover 13.

A pair of diagonal braces 16 are respectively mounted in suitable slots provided in the respective ends 11 and in sliding relation therein. Each of these braces 16 has a transversely extending projection 17 formed at the lower portion thereof, and this projection is adapted to engage the inner surface of the upper edge of the respective end 11 and retain the brace within the slot provided in the end. The openings through the upper edge of the end panels 11 are relatively small and the slots provided in said ends to respectively receive the lower portions of said braces are enlarged, as shown by the dotted lines in Fig. 4 to provide clearance for the swinging movement of said ends. The upper end portions of braces 16 are offset inwardly to form the shoulders 18 and the attachment flanges 19, as best shown in Figs. 1, 3, and 6. A key hole slot 20 is formed in each of the flanges 19 and a pair of pivot pins 21 are rigidly fixed to the inner surface of the top cover 13 in respectively inwardly spaced relation to the ends thereof. The key hole slots 20 are adapted to receive the pins 21, and the links or braces 16 are of sufficient length to permit the cover to swing back beyond the center and to be limited in this swinging movement by the stop elements 17 engaging against the inside of the top edges of the ends 11.

A food storage platform 22 is inserted into the chest and normally rests against the inside of the chest bottom. A peripheral flange 22a extends around the entire peripheral edge thereof to support the horizontal portion of the platform in raised position above the bottom of the chest. At least one end flange has a number of cut out portions 22b, as best shown in Fig. 4, to permit circulation of cold air under the platform 22. A number of fenestrations 23 are formed in intermediate portions of said platform as by being struck out of the platform material and said struck out material is bent downwardly along one end thereof to form platform supporting legs or struts to reinforce intermediate portions of the platform as best shown in Fig. 3. A partition designated as an entirety by the numeral 25 is swingably mounted in hinged relation to the end of platform 22 provided with the ventilation openings 22b. In the form shown, a loose or sloppy hinge construction is provided as by the rings 26. The partition 25 has a finger receiving aperture 25a formed in the outer free end portion thereof, and a pair of side flanges 25b are bent downwardly along the two sides extremities thereof to support said partition in spaced relation above the chest bottom when said partition is in horizontally disposed position, as shown by the dotted lines of Fig. 3 to form a continuous flat raised platform across the entire chest bottom.

Suitable means are provided for holding the partition 25 in upstanding position, such as the depending locking pins or prongs 27 which are formed at the two sides of partition 25 in downwardly extending position, and in the form shown are constructed from bent down end portions of an elongated rod 28 extending across the entire upper edge portion of the partition and around which the upper marginal edge portion of said partition 25 is rolled. A pair of prong receiving loops or sockets formed from straps 29 are respectively fixed to the inside walls of the sides 12 and are adapted to slidably receive the respective pins 27 to hold the partition 25 in upstanding position. As best shown in Fig. 4, the upper side portions have clearance providing recesses 25c formed therein which provide space to permit the partition to be elevated to position the pins 27 above the respective sockets formed by the straps 29. The rings 26 permit sufficient vertical movement of the partition relative to platform 22 to permit raising the same to properly position said prongs which are subsequently respectively dropped into their respective sockets.

With the partition 25 in upstanding position, as shown by the full lines of Fig. 3, ice may be put into the ice compartment and supported directly on the chest bottom. A drain outlet 30 is provided in the bottom of the chest to permit the water from the melted ice to be removed from the chest.

As best shown by the dotted lines of Fig. 3, the platform 22 and partition 25 hingedly connected therewith, may be raised into elevated position and the flanges 22b engaged and supported by a number of inwardly extending projections or stop elements 31. The hinged partition 25 may be doubled back upon the platform 22 to permit access to the area below the platform or said partition may be swung into outwardly extending horizontal position to provide a continuous raised shelf which extends the full length and width of the chest. Additional stop elements 32 are provided to support the partition in horizontal position. It should also be noted that the partition may be dropped into depending position, in which position it merely hangs from the hinge rings 26 and divides the lower chamber into two compartments. It is desirable, in some instances, to provide a raised or elevated platform which may be used for dry storage of sandwiches or the like while the lower, relatively deep compartment may contain a substantial amount of iced water, in which cold drinks may be stored without danger of the food on the upper platform becoming wet.

With the platform 22 in lowered position, as shown by the full lines of Figs. 3 and 4 and with the partition held in upstanding relation, the inside of the chest is divided into an ice confining chamber and a food storage chamber in which the food stored on the slightly raised platform 22 will normally be kept dry and efficiently refrigerated by permitting the water from the ice to drain out through aperture 30. It might also be desirable to lower the partition 25 into horizontal position, as shown by the dotted lines adjacent the chest bottom 10, to provide a continuous flat platform across the entire bottom of the chest. A finger aperture 25a is provided in the upper portion of the partition to facilitate positioning the partition 25 in the desired angular relation to platform 22.

The two pintles 14 slidably receive the hinge sleeves 15 and not only permit the cover 13 to be swung about said pintles as an axis but also permit the same to be shifted longitudinally to remove the sleeves from the pintles. The diagonal bracing links 16 may also be removed from the pivot pins 21 by merely removing the key hole slots from said pins and permitting said braces to slide downwardly into their respective slots with the abutment shoulders 18 engaged against the top edge of the chest ends. This permits the cover to be removed and used for a tray or any other desired purpose. It should be noted that with the platform 22 in lowered position and the partition 25 in vertical dividing position, the bottom of the ice placed in the ice chamber rests directly on the bottom of the chest which is substantially lower than the top surface of the storage platform 22, and thereby eliminates the danger of water melting from the ice and running horizontally onto said platform to cause damage to the food being stored in the storage compartment. As the ice melts, the water merely runs down through the drain outlet 30.

It will be seen that an extremely efficient portable ice chest for storing foods and the like has been provided in which the food storage platform may be disposed in two raised positions above the bottom of the chest, and has a number of openings or fenestrations 23 formed therein to permit circulation of the air under the storage compartment and provide for more efficient cooling therein regardless of whether the platform 22 is in raised or lowered position. The hinged partition having the sloppy hinge joint and the depending prongs 27 provides in combination with the loops formed by the straps 29, a partition supporting and retaining connection which may be quickly and easily made or released to permit the desired positioning of said partition 25 when the platform is in lowered position. The partition thus serves the double function of forming a platform when in horizontal retracted position and forming a partition when in upstanding vertical position both when the platform 22 is in raised elevated position and when said platform is supported directly on the bottom 10 of the chest.

The multi-function platform 22 in combination with the multi-function hinged partition 25 and the design of my chest provides a highly efficient portable ice chest for storing foods and the like, which may be converted for a number of various uses as desired. The simple and ingenious design for the top cover and the braces for limiting the opening swinging movement thereof is an extremely important part of this invention and greatly simplifies the manufacture of a chest having a removable top hinged cover.

It will of course be understood that various changes may be made in the form, details, arrangements, and proportions of the parts without departing from the scope of my invention.

What is claimed is:

1. A portable ice chest for storing foods and the like comprising an insulated container including a bottom and upstanding sides and ends, said container having an access opening formed therein, a closure adjacent said opening shiftably connected to the container and adapted to be shifted into open and closed positions, a platform mounted in the bottom of said container with means for holding the same in upwardly spaced relation above said container bottom and extending only a portion of the length thereof, a partition hingedly connected along the inner edge of said platform to permit the same to be swung from horizontal to vertical position, and including means for holding the partition in upwardly spaced relation above the container bottom when in horizontal position, the combined length of the platform and the partition being substantially equal to the inside length of the container to provide a substantially continuous raised platform therein when said partition is disposed in horizontal position but dividing the container into a storage compartment and an ice compartment when said partition is raised into upstanding position, and means for releasably holding said partition in upstanding position.

2. A portable ice chest for storing foods and the like comprising an insulated container including a bottom and upstanding sides and ends, and having an opening in the top thereof, an insulated top cover shiftably connected to the upper peripheral edge portion of the container, a platform mounted in the bottom of the container with means for holding the same in vertically spaced relation slightly above the container bottom and being of a length substantially shorter than the inside length of the container, a partition panel hingedly connected along the inner end of said platform to permit the same to be swung from horizontal to vertical position, means for holding said partition panel in vertically spaced relation to the container bottom when in horizontal position, the combined lengths of the partition and platform being substantially equal to the inside length of the container to provide a substantially continuous raised platform therein when said partition is disposed in horizontal position but dividing the inside of the container into a storage compartment and an ice compartment when said partition is raised into upstanding position, a pair of vertically disposed pin elements and a pair of cooperating loops, one of said pairs being respectively fixed to the sides of the container and the other pair being connected to the upper portion of said partition panel, said hinge connection between the partition and the platform being constructed to permit vertical shifting movement of the partition relative to the panel.

3. The structure set forth in claim 2, and said vertically disposed pin elements being connected to said partition in depending relation at the respective upper side extremities thereof, said partition having a pair of clearance access recesses formed therein adjacent said pins, the remainder of said partition extending the full width of the container, said loops being fixed to said container side walls to respectively receive the pins therein when the same have been lifted into respective alignment therewith, and said hinge connection between said partition comprising a plurality of rings interconnecting the adjacent end portions of the platform and the partition and being of sufficient size to permit vertical shifting movement of the partition when aligning the pins above the respective loops.

4. A portable ice chest for storing foods and the like comprising an insulated container including a bottom and upstanding sides and ends, and having an opening in the top thereof, an insulated top cover removably connected to the upper portion of the container, a platform shiftably mounted within the container and being of a length substantially shorter than the inside length of the container, a partition panel hingedly connected along the inner end of said platform to permit the same to be swung on a horizontal axis into the desired angular relation relative to said platform, the combined lengths of the partition and the platform being substantially equal to the inside length of the container, means mounted in inwardly extending relation on intermediate portions of the upstanding sides and ends and adapted to support the platform in raised position a substantial distance above the bottom of the container to provide a dry food storage area on top of said platform and a wet food storage area below said platform, said hinged partition permitting access to the wet food storage area when swung into upwardly extending position.

5. A portable ice chest for storing foods and the like comprising an insulated container including a bottom and upstanding sides and ends, said container having an access opening formed therein in upwardly spaced relation from the bottom, a closure shiftably connected to the container adjacent said opening and adapted to be shifted into open and closed position, a platform mounted in the bottom of said container and having a plurality of struck-out fenestrations formed in intermediate portions thereof, the struck-out portions being bent downwardly along one edge thereof to engage the bottom of the container and support intermediate portions of said platform in spaced relation above the container bottom, the platform being of a length substantially shorter than the inside length of the container, a partition hingedly connected along the inner edge of said platform to permit the same to be swung from horizontal to vertical position and including means for holding said partition in horizontally aligned relation to said platform when in horizontal position, the area below the end of said platform having a number of openings therein to permit the circulation of air to flow under said platform and upwardly through the fenestrations therein, the combined lengths of the platform and partition being substantially equal to the inside length of the container and means for releasably holding said partition in upstanding position to divide the container into a storage compartment and ice compartment.

6. The structure set forth in claim 5 and said container bottom having a water outlet opening formed therein to maintain the water level therein below the level of the platform at all times.

RICHARD C. LARAMY.

References Cited in the file of this patent
UNITED STATES PATENTS

| Number | Name | Date |
|---|---|---|
| 1,209,627 | Saunders | Dec. 19, 1916 |
| 1,895,864 | Ricci | Jan. 31, 1933 |
| 2,454,303 | Brodheim | Nov. 23, 1948 |